Jan. 23, 1962 H. E. SCHROEDER 3,017,699
METHOD OF MAKING BOLTING COLLARS
Original Filed April 13, 1954
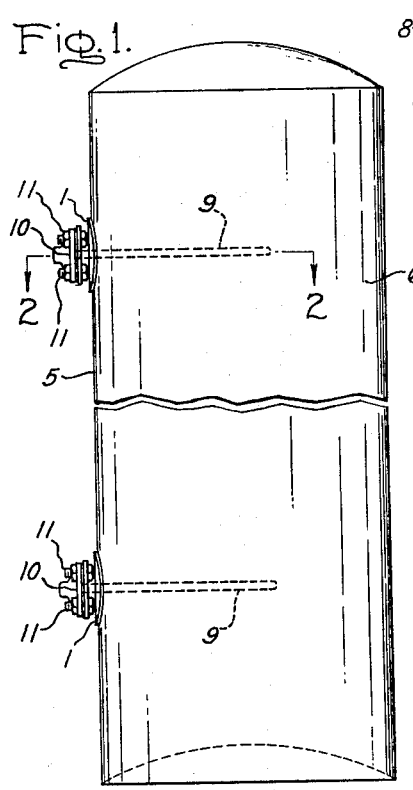
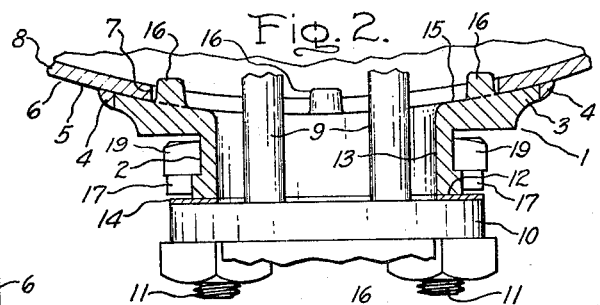
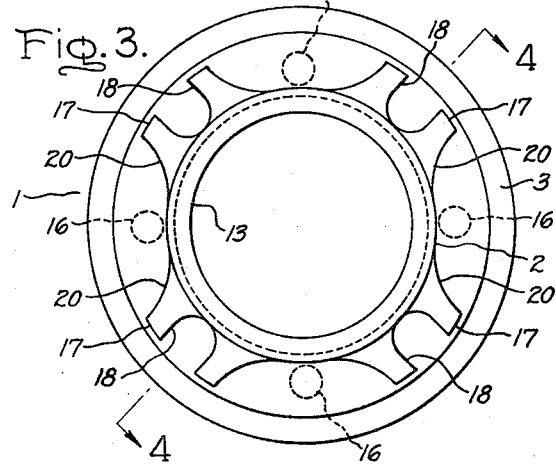
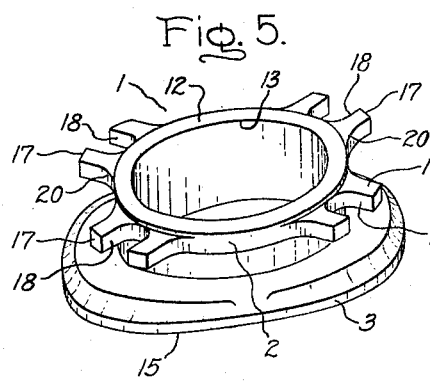
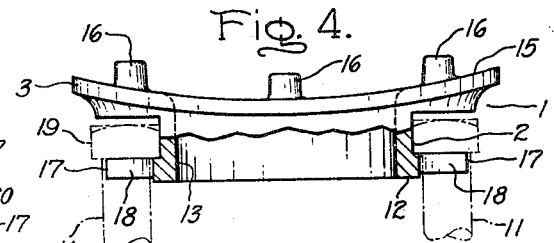
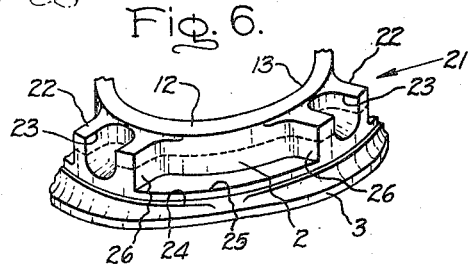
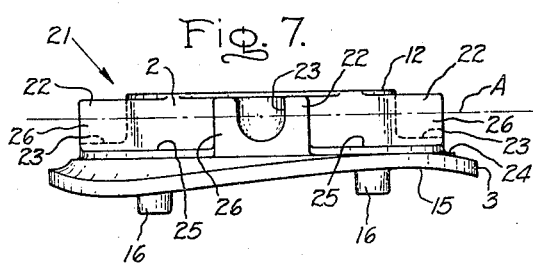
Inventor:
Harry E. Schroeder,
By James J. Lazna
His Attorney.

3,017,699
METHOD OF MAKING BOLTING COLLARS

Harry E. Schroeder, Cleveland Heights, Ohio, assignor to Mondie Forge Company, a corporation of Ohio
Original application Apr. 13, 1954, Ser. No. 422,809. Divided and this application May 1, 1958, Ser. No. 732,211

3 Claims. (Cl. 29—556)

My invention relates to a method of making a bolting collar or adapter for attachment to the outer side of a hot water tank to serve as a means for mounting an electric heating element in the tank.

In my co-pending application Serial No. 422,809, filed April 13, 1954, and now abandoned, of which the present application is a division, I have described and claimed an improved form of bolting collar or adapter for welding to the outer side wall of a hot water tank around an aperture therein to serve as a means for mounting an electric heating element within the tank. As disclosed in the said co-pending application, the improved adapter is constituted of a short cylindrical or tubular collar portion having an outwardly extending welding flange adjacent one end thereof for abutting against and welding to the outer side of the hot water tank, and bolt-anchoring or flange means extending outwardly from the collar portion at its other end and provided with outwardly opening bolt-receiving slots, the bolt-anchoring means being spaced a sufficient distance from the welding flange to accommodate therebetween the heads of conventional fastening bolts inserted in the slots. The bolt-anchoring means is preferably constituted by a plurality of separate slotted lugs or ears extending outwardly from the collar portion of the adapter at spaced points therearound but terminating short of the outer periphery of the welding flange.

It is an object of my invention to provide a novel method of making a forged adapter of the above described character having separate welding flange and slotted bolt-anchoring means extending outwardly from the tubular portion of the adapter in spaced relation to each other.

Another object of my invention is to provide a simple and inexpensive method of making, by a minimum number of manufacturing operations, a forged adapter of the above described character wherein the bolt-anchoring means is constituted by a plurality of slotted lugs or ears extending outwardly from and spaced around the tubular portion of the adapter.

Further objects and advantages of my invention will appear from the following detailed description of a species thereof and from the accompanying drawings in which:

FIG. 1 is an elevation of a hot water tank of the electrically heated type provided with a bolting collar or adapter according to my invention;

FIG. 2 is a horizontal section on the line 2—2 of FIG. 1 with the electrical heating unit shown in plan;

FIG. 3 is a plan view of the adapter comprising my invention;

FIG. 4 is a view of the adapter partly in elevation corresponding to FIG. 2 and partly in section on the line 4—4 of FIG. 3;

FIG. 5 is a perspective view of the adapter; and

FIGS. 6 and 7 are fragmentary perspective and elevation views, respectively, of the adapter of my invention at an intermediate stage in the manufacture thereof.

Referring to the drawings, the bolting collar or adapter 1 comprising my invention consists of a metal forging made of a suitable metal, such as a free machining readily weldable low carbon steel or a non-ferrous alloy such as that commercially known as "Everdur," and comprising a substantially cylindrical ring or collar portion 2 provided adjacent one end with an outwardly extending welding flange 3 which in the use of the adapter is welded around its outer periphery, as indicated at 4 in FIG. 2, to the outer side 5 of a conventional cylindrical type hot water tank 6, around one of the vertically spaced circular apertures 7 which are customarily provided in the side wall 8 of the tank for receiving the electric heating elements 9. The heating elements 9 are each carried by a support head or cover plate 10 which is fastened by bolts 11 to the outer end 12 of the adapter 1 over the opening or bore 13 thereof so as to close it off, a sealing gasket 14 of fiber or other suitable sealing material being customarily interposed between the outer end 12 of the adapter 1 and the cover plate 10 in order to assure an effective water-tight seal therebetween. The tank-engaging side 15 of the welding flange 3 is concavely curved to conform to and rest flush against the outer side 5 of the tank wall 8. The welding flange 3 is provided with a plurality (at least three and preferably four) of locating lugs or bosses 16 protruding from the tank-engaging side 15 of the welding flange, the said lugs being located closely adjacent, e.g., within ¼ inch or so of the outer periphery of the welding flange and being circularly disposed thereabout so as to fit more or less closely into the circular aperture 7 in the tank wall 8 for centering the adapter relative to the aperture.

At its outer end, the collar portion 2 of the adapter 1 is provided with bolt anchoring or flange means preferably in the form of a plurality (four in the particular case shown) of separate radially outward extending bolting lugs or ears 17 spaced equally around the circumferential extent of the collar portion 2. The bolting lugs or ears 17 are provided with outwardly opening radial slots 18 for receiving the fastening bolts 11 which are slid sideways thereinto. The lugs 17 are spaced a sufficient distance (5/16 inch in the particular case shown) from the welding flange 3 to provide sufficient space for the accommodation therebetween of the bolt heads 19, as shown in FIG. 2. In addition, the bolting lugs extend a sufficient distance radially outward from the collar portion 2 to provide adequate bearing area for the bolt heads 19, but they terminate short of, i.e., they are of somewhat smaller diameter than the outer periphery of the welding flange 3 so as not to offer any obstruction to or interfere with the welding of the outer periphery of the flange 3 to the tank 6. Thus, in the particular case illustrated wherein the collar portion 2 of the adapter has an inside diameter of 1¾ inch and an outside diameter of 2 inches, the welding flange 3 is of 3⅜ inch outside diameter while the outer ends of the bolting lugs 17 lie in a circle having a diameter of 2⅞ inch so that the lugs project a distance of around 7/16 inch radially outward from the collar portion 2. Also, in the particular case shown, the bolt-receiving slots 18 are approximately ⅜ inch in width in order to readily accommodate the ⅜ inch bolts 11 which are customarily employed for fastening the electric heating units 9, 10 to the adapters. For strengthening purposes, the lugs 17 are preferably flared out in width at their inner ends where they join with the collar portion 2, as indicated at 20 in FIG. 3.

In manufacturing an adapter 1 in accordance with the invention, the first step is the production of a rough forging or adapter blank 21 of the general form shown in FIGS. 6 and 7 wherein a plurality of ribs 22, conforming in number and location to the bolting lugs 17, are provided on the outer surface of the tubular collar portion 2 and extend therealong from one end of said collar portion to the welding flange, the ribs 22 being formed with radial notches or slots 23 having a length and width conforming to the bolt-receiving slots 18 of the finished adapter and having a depth, from the bolting face end 12 of the collar portion 2, at least equal to the thickness of the bolting lugs 17 in the finished adapter. In addition, the welding flange 3 of the rough forging or adapter blank 21 is provided, on its top or rib-adjoining side 24 and outwardly of the collar portion 2, with arcuately shaped raised or platform portions 25 of thin character, i.e., around 1/16 inch thick or so, which extend between and correspond in outside diameter to and join the various ribs 22 so as to form, in conjunction therewith, a continuous annular layer or ring of metal around the adapter immediately adjoining the said top side 24 of the welding flange 3.

The rough forging or adapter blank 21 thus formed is then placed in a lathe, milling or other cutting machine and the portions 26 of the ribs 22, extending from the plane of the top side 24 of the welding flange 3 to the plane A in FIG. 7 (which is also denoted by the dotted line in FIG. 6 and defines the undersides of the bolting lugs 17 to be formed), are then cut away or removed by a turning, milling or other cutting operation to the required radial depth to thereby notch or undercut the ribs 22 adjacent the flange 3 and through a portion only of their notched extent and in addition slightly undercut the collar portion 2 so as to transform the notched ribs 22 into slotted bolting lugs 17 having through slots 18 therein and at the same time provide sufficient space between the lugs 17 and the welding flange 3 to accommodate the bolt heads 19 and permit insertion of the bolts 11 into the slots 18 to the extent necessary to position them in the customary 2½ inch bolt circle. During the rib undercutting operation, the raised or platform portions 25 of the adapter insure that the cutting tool, in the course of its cutting movement or action around the adapter, will be continuously cutting the metal of the adapter.

What I claim is:

1. The method of making an adapter for the purpose set forth which comprises forging a collar-shaped member comprising a short tubular portion provided with an outwardly extending flange and having a plurality of external ribs thereon spaced apart around the tubular portion and extending therealong from one end thereof to the said flange, the said ribs having respective outwardly opening notches extending longitudinally of the tubular portion for at least a portion of the lengths of the ribs from the said end of the tubular portion, and then undercutting the said ribs through a portion only of their notched extent adjacent said flange to transform the said notched ribs into slotted lugs having through slots therein, the said undercutting of the ribs being extended to a depth sufficient to permit the heads of fastening bolts inserted in said slots to be caught behind the slotted lugs formed by the undercut ribs.

2. The method of making an adapter for the purpose set forth which comprises forging a collar-shaped member comprising a short tubular portion provided with an outwardly extending flange and having a plurality of external ribs thereon spaced apart around the tubular portion and extending therealong from one end thereof to the said flange, the said ribs having respective outwardly opening notches extending longitudinally of the tubular portion for at least a portion of the lengths of the ribs from the said end of the tubular portion, and then simultaneously cutting said flange and undercutting the portions of said ribs adjacent said flange, including a portion only of their notched extent, to transform the said notched ribs into slotted lugs having through slots therein, the said undercutting of the ribs being extended to a depth sufficient to permit the heads of fastening bolts inserted in said slots to be caught behind the slotted lugs formed by the undercut ribs.

3. The method of making an adapter for the purpose set forth which comprises forging a collar-shaped member comprising a short tubular portion provided with an outwardly extending flange at one end thereof and having a plurality of external ribs thereon spaced apart around the tubular portion and extending therealong from the said flange to the other end of the tubular portion, the said ribs having respective outwardly opening notches extending therealong for at least a portion of the lengths of the ribs from the said other end of the tubular portion, and then undercutting the said ribs to a depth approximately corresponding to the outside diameter of the tubular portion and for a portion only of their length from the said flange but including at least a portion of the notched extent of the ribs so as to transform the said notched ribs into slotted lugs having through slots therein.

References Cited in the file of this patent

UNITED STATES PATENTS

| | | |
|---|---|---|
| 1,497,530 | Mortensen | June 10, 1924 |
| 1,679,464 | Carver | Aug. 7, 1928 |
| 1,816,293 | Oberhuber | July 28, 1931 |
| 2,262,765 | Ilg | Nov. 18, 1941 |
| 2,613,312 | Thurston | Oct. 7, 1952 |

FOREIGN PATENTS

| | | |
|---|---|---|
| 15,510 | Great Britain | Mar. 21, 1907 |